United States Patent [19]
de Keijzer et al.

[11] Patent Number: 5,985,960
[45] Date of Patent: Nov. 16, 1999

[54] POLYMER COMPOSITION CONTAINING CONDENSATION PRODUCT OF MELAMINE

[75] Inventors: Augustinus E. H. de Keijzer, Sittard; Bernardus J. H. Dijkstra, Heerlen, both of Netherlands

[73] Assignee: DSM N.V. Octroolbureau, Heerlen, Netherlands

[21] Appl. No.: 08/862,958

[22] Filed: Jun. 2, 1997

Related U.S. Application Data

[63] Continuation of application No. PCT/NL95/00402, Nov. 23, 1995.

[30] Foreign Application Priority Data

Dec. 1, 1994 [BE] Belgium ................................. 9401088

[51] Int. Cl.$^6$ .................................................. C08K 5/349
[52] U.S. Cl. .......................... 524/100; 524/120; 544/200
[58] Field of Search .................... 524/120, 100; 544/200

[56] References Cited

U.S. PATENT DOCUMENTS 4,552,912  11/1985  Williams ................................ 524/100
4,966,931  10/1990  Akitaya et al. ...................... 524/100

OTHER PUBLICATIONS

N.K. Gavrilova et al., Chemical Abstracts, "Synthesis of melam and its salts with inorganic acids," vol. 87, No. 1, Jul. 4, 1977, Abstract No. 5918m.

V. A. Gal'perin et al., Chemical Abstracts, "Synthesis of melam from melamine," vol. 7, No. 11, Nov. 1971, Abstract No. 59574n.

Translation from Zhumal Organicheskoi Khimii, vol. 7, No. 11, pp. 2431–2432, Nov., 1971.

Translation from Zhumal Organicheskoi Khimii, vol. 13, No. 34, pp. 669–670, Mar, 1977.

*Primary Examiner*—Yogendra N. Gupta
*Attorney, Agent, or Firm*—Pillsbury Madison & Sutro LLP

[57] ABSTRACT

A process for the preparation of a melamine condensation product comprising the step of heating a starting material comprising melamine or a melamine salt in the presence of: (i) at least one organic acid, (ii) at least one ammonia or melamine salt of the organic acid, or (iii) a mixture of (i) and (ii), under reaction conditions effective for the formation of the melamine condensation product. The melamine condensation product with a residual condensation agent content of less than 1 wt. % is useful in a moldable polymer composition possessing flame-retardant properties.

23 Claims, No Drawings

POLYMER COMPOSITION CONTAINING CONDENSATION PRODUCT OF MELAMINE

This is a Continuation of International Appln. No. PCT/NL95/00402 filed Nov. 23, 1995 which designated the U.S.

BACKGROUND OF THE INVENTION

1. Field of the Invention

The invention relates to a process for the reparation of a melamine condensation product, and ore particularly, to the preparation of a melamine condensation product that is free of halogens and imparts flame-retardancy.

2. Description of Related Art

Melamine forms melamine condensation products when heated under certain reaction conditions. Ammonia is evolved in the reaction. Similarly, melamine salts form condensation products when heated. Melamine condensation products include melem, melone, and melam, as well as salts thereof. Generally, melam ($C_6H_9N_{11}$) forms upon heating melamine and/or melamine salts below 315° C. and is a by-product of melamine synthesis. For purposes of the present invention, a melamine condensation product encompasses a product that results from self-condensation of melamine or a melamine salt with the evolution of ammonia. Hence, for example, a melamine condensation product is not the product from the condensation reaction between melamine and, for example, formaldehyde to yield amino resins.

Specific processes relating to the preparation of melam via condensation are described in, for example, V. A. Gal'perin et al., *Zhurnal Organicheskoi Khimii*, Vol. 7, No. 11, pp. 2431–2432 (Nov. 1971) and Gavrilova et al., *Zhurnal Organicheskoi Khimii*, Vol. 13, No. 3, pp. 669–670 (March 1977). In laboratory scale experiments, melamine was converted to a salt of melam with use of a $ZnCl_2$ condensation agent at a temperature between 290° C. and 320° C. Specifically, 3.3 grams of melamine was mixed with 1.7 grams of anhydrous zinc chloride and heated for 1 hour at a temperature of 290° C. in an open tube. The open tube is a so-called stationary system. The product was washed with boiling methanol to remove residual zinc chloride. It was then washed with diluted hydrochloric acid to remove residual melamine. The zinc salt of melam thus obtained contained 87.2 wt. % of melam and 11.8 wt. % of zinc. In an additional treatment to prepare melam from the melam zinc salt, the zinc salt of melam was boiled for 5–7 minutes in a 1% solution of sodium hydroxide. Next, the solution was filtered off and cooled. The precipitate was washed with hot water and dried for 2 hours at a temperature of 170° C. The yield of the product was 2.7 grams.

The percentages of zinc and chlorine in the melam product after this additional treatment were not reported in this reference. In later work, however, the melam product of this reaction was found to have a residual content of 3.5 wt. % of zinc and 1.6 wt. % of chloride. In other words, significant amounts of zinc chloride remain in the melam, even after attempts to remove it.

The presence of zinc and chloride impurities is a significant drawback. Both ions are difficult to wash out. Furthermore, washing zinc and chloride out of the product can result in a high degree of hydrolysis of the melam.

Alternatively, melamine can also be converted to a condensation product like melam on a laboratory scale (e.g. milligram or gram scale) in the presence of inorganic acids as condendation agents. Inorganic acids include HCl, HBr, sulfuric acid, phosphoric acid, and mixtures thereof. The ammonia or melamine salts of these acids can also be used. However, there are drawbacks to these alternative small scale syntheses. These include, among others, a need for high reaction temperature, low yields, a high degree of melamine sublimation, formation of by-products, and halogen residues in the end product. These drawbacks render these alternatives unsuitable for commercial scale (e.g. kilogram- or tonnage-scale) production of a condensation product of melamine.

SUMMARY AND OBJECTS OF THE INVENTION

An object of the present invention is to provide a process for the preparation of a melamine condensation product that reduces or eliminates the need for the heretofore difficult practice of removing residues from the product.

Another object of the present invention is to provide a process capable of producing a melamine condensation product on a large or commercial scale.

A further object of the present invention is to provide an efficient process for producing a melamine condensation product in the absence of halogens.

These and other objects are satisfied by a process for the preparation of at least one melamine condensation product comprising the step of heating a starting material comprising melamine or a melamine salt in the presence of: (i) at least one organic acid, (ii) at least one ammonia or melamine salt of the organic acid, or (iii) a mixture of (i) and (ii), under reaction conditions effective for the formation of melamine condensation product.

A further object of the present invention is to provide a moldable polymer composition which has flame-retardant properties and thermal stability.

These and other objects are satisfied according to the present invention by a polymer composition comprising: 1) a melamine condensation product, and 2) moldable polymer, wherein the amount of the melamine condensation product and the amount of moldable polymer are sufficient to provide flame retardancy and moldability to the polymer composition.

Advantages of the process of the present invention include reducing or eliminating the need for the difficult step of removing residual condensation agent. In addition, the melamine condensation products obtained according to the present invention impart the necessary levels of flame resistance for many applications.

It has further been found that melamine condensation products such as melam with a residual condensation agent content of less than 1 wt. %, more in particular less than 0.5 wt. %, are highly suitable for use as flame-proofing agents in polymer compositions. Melamine condensation products possess high thermal stability in comparison with other flame-proofing agents such as, for example, halogen compounds and melamine. Melam and higher melamine condensation products such as melem, melon and methone do not extensively sublime and decompose at temperatures below 350° C. As a result, the polymer compositions according to the present invention exhibit better thermal stability compared to compositions incorporating conventional flame proofing agents. A further advantage is that mold deposits tend not to form during injection molding of the melam-filled polymer compositions.

DETAILED DESCRIPTION OF THE INVENTION

The melamine condensation products of the present invention are the result of self-condensation of a starting material comprising melamine or melamine salt resulting in the evolution of ammonia. Exemplary melamine condensation products include melam, melem, and melone. Preferably, the melamine condensation product comprises mainly melam.

Examples of melamine salts include salts prepared from phosphoric acid, sulfuric acid, nitric acid, fatty acids, and formic acid.

The heating step of the present invention is effected at temperatures and under reaction conditions that effect the formation of a melamine condensation product. For example, the heating step can be effected at temperatures between about 250° C. and about 350° C. By preference, however, the heating step is effected at a temperature between about 280° C. and about 320° C. Preferably, ammonia is removed from the reaction site as it is evolves.

As a condensation agent an organic acid is used in the present invention. The organic acid of the present invention can be selected from a variety of organic acids. In general, the organic acid can have, for example, a carboxylic, sulfonic, or phosphoric group in its structure. Other acidic groups are possible. Sulfonic acids are preferred organic acids. Most preferably, para-toluene sulfonic acid is used.

A mixture of organic acids can be used. In addition, an ammonia or melamine salt of the organic acid can be used. Mixtures of organic acid and ammonia or melamine salts thereof can be used. Preferably, an organic acid is used.

In general, the amount of organic acid or salt of organic acid can be, for example, between about 0.05 to about 5.0 mol relative to the amount of melamine or melamine salt. By preference, the amount of organic acid or salt of organic acid is between about 0.1 to about 3.0 mol relative to the amount of melamine or melamine salt.

The heating step is preferably effected while providing at least some agitation to the reaction mixture. For example, the reaction mixture can be stirred. By preference, the reaction is carried out in a stirred reactor that is virtually horizontally mounted. As a result of condensation, ammonia, $NH_3$, is formed. Ammonia can be purged from the reactor with use of an inert gas such as, for example, nitrogen. The length of the reaction is 1–6 hours, by preference 3–5 hours.

Preferably, a melam salt is the predominate melamine condensation product. The melam salt can be neutralized with a base to yield melam. Bases can be, for example, ammonia, sodium hydroxide, sodium bicarbonate, and solutions thereof. Ammonia solution is preferred. Besides melam, other melamine condensation products such as melem, melone, and methone can also form, depending on the reaction conditions. The amount of melamine condensation products is determined by HPLC (=high pressure liquid chromatography).

The melamine condensation can be carried out by preference in a virtually horizontally mounted stirred reactor at a temperature between about 250° C. and about 350° C. Surprisingly it has been found that, in a virtually horizontally mounted reactor at a temperature between about 250° C. and about 350° C., a variety of substances can be used as condensation agent to aid the condensation reaction. These include, for example, metal salts. Metals salts include Lewis acids. Acids such as inorganic acids such as hydrohalic acids, sulfuric acid, and phosphoric acid can also be used. Ammonium or melamine salts of these acids can also be used. High-boiling organic acids such as fatty acids or sulfonic acids can also be used. Examples of high-boiling organic acids are stearic, palmitinic and/or oleic acids.

The melamine condensation product such as melam can be mixed with polymers to yield flame-proof compositions. It has been found that melamine condensation products such as melam, with a residual condensation agent content below 1 wt. %, more in particular below 0.5 wt. %, are highly suitable for use as flame proofing agents in polymer compositions. The flame-proofed polymer compositions, e.g., at least flame retardant, can be prepared by mixing one or more polymers together with a melamine condensation product such as melam in, for example, an extruder at an elevated temperature of, for example, between about 150° C. to about 450° C. The mixture is transformed into granules (or other desired physical form, e.g. pellets, powders, flakes, etc.).

The relative amounts of melamine condensation product and moldable polymer are selected so that the final composition is provided with flame retardancy and moldability. The quantity of melamine condensation product can be, for example, between about 5 to about 35 wt. %, and more particularly, between about 10 to about 25 wt. %.

The final physical form of the composition is not presently thought to be critical, provided that the material, whatever its form, possesses flame-retardancy. Pulverulent particles of the polymer compositions are preferred which are relatively uniform in composition. The transformation to a final physical form can be practiced in diverse manners as known to those skilled in the art. Polymers which can be flame-proofed by means of the melamine condensation product are preferably moldable polymers. Preferably, the polymers can be injected molded and are thermoplastic polymers. In some cases, however, thermosetting polymers can also be used. Diverse polymers and mixtures of polymers can be used. Examples include one or more of the following polymers:

(1) Polymers of mono- and di-olefins, such as, for example, polypropylene (PP), polyisobutylene, poly-1-butene, polymethyl-1-pentenes, polyisoprene, polybutadiene, polyethylene (optionally crosslinked), such as, for example, high-density polyethylene (HDPE), low density polyethylene (LDPE) or linear low-density polyethylene (LLDPE) or mixtures thereof;

(2) Copolymers of mono- and di-olefins, optionally with other vinyl monomers, such as, for example, ethylene-propylene copolymers, linear low-density polyethylene and mixtures of these with low-density polyethylene, as well as terpolymers of ethylene with propylene and a diene such as hexadiene, dicyclopentadiene or ethylidene norbornene (EPT); further, mixtures of such copolymers with the polymers described under (1), such as, for example, polypropylene/ethylene-propylene copolymers;

(3) Polystyrene, poly(p-methylstyrene), poly(α-methylstyrene) and copolymers of styrene or α-methylstyrene with dienes or acryl derivatives, such as, for example, styrene butadiene, styrene acrylonitrile, styrene alkylmethacrylate, styrene butadiene alkylacrylate, styrene-maleic anhydride, styrene-acrylonitrile-methylacrylate, as well as block copolymers of styrene, such as, for example, styrene-butadiene-styrene, styrene-isoprene-styrene, styrene-ethylene/butylene-styrene or styrene-ethylene/propylene-styrene;

(4) Graft copolymers of styrene or α-methylstyrene on polybutadiene, polybutadiene-styrene or polybutadiene-acrylonitrile copolymers; styrene and acrylonitrile (or methacrylonitrile) on polybutadiene (ABS); styrene, acrylonitrile and methylmethacrylate on polybutadiene (MBS); styrene and maleic anhydride on polybutadiene; styrene, acrylonitrile and maleic anhydride or maleic acid imide on polybutadiene; styrene and maleic acid imide on polybutadiene; styrene and alkyl acrylate (or alkyl methacrylate) on polybutadiene; styrene and acrylonitrile on ethylene-propylene-diene terpolymer (AES), polyalkyacrylate or polyalkylmethacrylate on acrylate-butadiene copolymer, as well as mixtures with the copolymers described under (3).

(5) Polymers derived from $\alpha,\beta$-unsaturated acids and derivatives thereof, such as polyacrylates and polymethacrylates and polyacrylamide and copolymers thereof with other unsaturated monomers, such as, for example, acrylonitrile-butadiene copolymers, acrylonitrile-alkylacrylate copolymers, acrylonitrile-alkoxyalkylacrylate copolymers or acrylonitrile-alkylmethacrylate-butadiene terpolymers;

(6) Polymers derived from unsaturated alcohols and amines or their acyl derivatives or acetals, such as polyvinyl alcohol, polyvinyl acetate, polyvinyl stearate, polyvinyl benzoate, polyvinyl maleate, polyvinyl butyral, polyallyl phthalate, polyallyl melamine, as well as the copolymers with the olefins described under (1);

(7) Homopolymers and copolymers of cyclic ethers, such as polyalkylene glycols, polyethylene oxide, polypropylene oxide or their copolymers with bisglycidyl ethers;

(8) Polyacetals, such as polyoxymethylene, as well as such polyoxymethylenes containing comonomers such as, for example, ethylene oxide; polyacetals modified with thermoplastic polyurethanes, acrylates or MBS;

(9) Polyphenylene oxide and sulfide and their mixtures with styrene polymers or with polyamides;

(10) Polyurethanes derived from polyethers, polyesters and polybutadiene with terminal hydroxyl groups on the one hand and aliphatic or aromatic polyisocyanates on the other, as well as their precursor products;

(11) Polyamides and copolyamides which are derived from diamines and dicarboxylic acids and/or from amino carboxylic acids or the corresponding lactams, such as polyamide 4, polyamide 6/6, 6/10, 6/9, 6/12, 4/6, polyamide 11, polyamide 12, aromatic polyamides based on an aromatic diamine and adipic acid; polyamides made from hexamethylene diamine and isophthalic and/or terephthalic acid and optionally an elastomer as modification agent, for example, poly-2,4,4-trimethyl hexamethylene terephthalamide, poly-m-phenyleneisophthalamide; block copolymers of polyamides with polyolefins, olefin copolymers, ionomers or chemically bound or grafted elastomers, or with polyethers such as, for example, with polyethylene glycol, polypropylene glycol or polytetramethylene glycol; further, polyamides or copolyamides modified with EPT or ABS, as well as polyamides formed during the processing (RIM polyamide systems);

(12) Polyureas, polyimides, polyamide imides, polybenzimidazols, and polysiloxanes;

(13) Polyesters derived from dicarboxylic acids and dialcohols and/or from hydroxycarboxylic acids or the corresponding lactones such as polyethylene terephthalate, polybutylene terephthalate, poly-1,4-dimethylolcyclohexane terephthalate, polyhydroxybenzoates, as well as block polyether esters derived from polyethers with hydroxyl end groups; further, polyesters modified with polycarbonates or MBS;

(14) Polycarbonates, polyester carbonates, polysulfones, polyether sulfones and polyether ketones; and

(15) Thermosetting resins such as, for example, unsaturated polyesters, saturated polyesters, alkyd resins, polyacrylates or polyethers or compositions comprising one or more of these polymers and a crosslinking agent.

The flame-proofed polymer compositions can also contain ingredients used in polymer compositions as known to those skilled in the art such as, for example, fillers, plasticizers, lubricants, stabilizers, flame retardants, synergists, processing aids, and reinforcing fibers such as carbon fibers or glass fibers.

EXAMPLES

The present invention will be illustrated by means of the following non-limiting examples.

Comparative Example A

Melamine (5 grams) (DSM) and anhydrous zinc chloride (2.5 grams) were heated in an open tube for 1 hour at 290° C. The product was first washed with boiling methanol and then with diluted hydrochloric acid to yield the zinc salt of melam. The zinc salt of melam was boiled for 6 minutes in a 1% NaOH solution. After filtration and cooling, the product was dried at 170° C. for two hours to yield melam (3.95 grams). Analysis of the product showed 3.5 wt. % of zinc and 1.6 wt. % of chloride.

Comparative Example B

A mixture of melamine (25.2 gram) (DSM) and ammoniumchloride (5.4 gram) was heated with stirring at a temperature of 340° C. in a 300 ml flask placed in an oven. Ammonia ($NH_3$) formed during the condensation reaction was removed from the reaction mixture by means of nitrogen. The ammonia was trapped with a 1 molar $H_2SO_4$ solution. After a reaction time of 2 hours at 340° C., the contents of the flask were cooled and washed with one liter of a 3% ammonia solution. After filtering and drying, melam (21.2 gram) was obtained. The chloride content was 5.7 wt. %. The melam yield was 90%.

Comparative Example C

A mixture in powder from comprising of 80 wt. % of nylon 4,6 (Stanyl® from DSM) and 20 wt. % melam prepared as described in comparative example A, was extruded in a twin-screw extruder at a temperature of 320° C. and the extrudate was granulate. The residual amount of chloride in the granulate obtained, made the product unsuitable for further processing due to corrosion behaviour.

EXAMPLE 1

A mixture of melamine (252 grams) (DSM) and paratoluene sulfonic acid monohydrate (174 grams) (Hoechst) was heated with stirring at a temperature of 290° C. in a 2-liter flask placed in an oven. Ammonia ($NH_3$) formed from the condensation reaction and was removed from the reaction mixture by means of nitrogen. The ammonia was trapped with a 1 molar $H_2So_4$ solution. After a reaction time of 2 hours at 290° C., the contents of the flask were cooled and washed with 1 liter of a 3% ammonia solution. After filtering and drying, melam (235 grams, yield 100%) was obtained. The sulfur content was less than 0.015 wt. %. Hence, the paratoluene sulfonic acid content was less than 0.08 wt. %.

EXAMPLE 2

A mixture of melamine (25.2 gram) and ammoniumparatoluenesulphonate (18.9 gram) was heated with stirring at a temperature of 290° C. in a 300 ml flask placed in an oven.

Ammonia (NH$_3$) formed during the condensation reaction was removed from the reaction mixture by means of nitrogen. The ammonia was trapped with a 1 molar H$_2$SO$_4$ solution. After a reaction time of 2 hours at 290° C., the contents of the flask were cooled and washed with one liter of a 3% ammonia solution. After filtering and drying, melam (23.1 gram) was obtained. The paratoluene sulfonic acid content was below 0.1 wt. %.

EXAMPLE 3

A horizontally arranged double-walled stirred reactor with an effective capacity of 120 liters was heated via a thermostatically controlled oil-heated reactor jacket set at 350° C. The reactor was filled with melamine (37.2 kg) and para-toluene sulfonic acid (25.3 kg). The reactor was operated under a mild nitrogen overpressure (0.6 m$^3$/h) in order to remove all ammonia formed in the condensation reaction. The temperature of the reactor contents was gradually raised to 300° C., after which the contents were allowed to cool. The total reaction time was 260 minutes of which approximately 60 minutes is spent for heating. The product was washed with a 3% ammonia solution to yield melam. The melam was dried for 3 hours at a temperature of 175° C. to yield dry melam powder. 34.1 kg (yield 99.1%) of dry melam powder was obtained with a paratoluene sulfonic acid content of 0.2 wt. %.

Flame-Proof Test

To evaluate the flame proofing characteristics of various polymer compositions, granules of polymer composition were processed into test bars by injection molding at a temperature between about 250° C. and about 400° C. The test bars measured 127×12.7×2.5 mm, 127×12.7×1.6 mm, and 127×12.7×1.0 mm. The test bars (10 for each experiment) were subjected to the test method according to Underwriters Laboratories, Inc., Bulletin 94, (UL 94) Combustion Test for the Classification of Materials.

In accordance with this test method, the materials examined were classified as 94 V-1, 94 V-1, or 94 V-2 on the basis of the results from the 10 samples per experiment. A classification of 94 V-0 is most difficult to attain, and many applications require UL 94 V-0 ratings at very thin sections. The criteria for each of these classifications according to UL 94 are as follows:

- UL 94 V-0: the flaming time and/or glowing time after removal of the test flame should not exceed 10 seconds, and on average, it should not exceed 5 seconds. None of the specimens may drip flaming particles which ignite absorbent cotton.
- UL 94 V-1: the flaming time and/or glowing time after removal of the test flame should not exceed 30 seconds, and on average, it should not exceed 25 seconds. None of the specimens may drip flaming particles which ignite absorbent cotton.
- UL 94 V-2: the flaming time and/or glowing time after removal of the test flame should not exceed 30 seconds, and on average, it should not exceed 25 seconds. The specimens drip flaming particles which ignite absorbent cotton.

Test bars which flame for more than 30 seconds, and on average, for more than 25 seconds after removal of the test flame are not classified according to UL 94 but are classified as "flaming". UL 94 further requires all specimens of a test to meet the V requirements.

EXAMPLE 4

A mixture in powder form comprising of 80 wt. % of nylon 4/6 (36.1 kg, Stanyl™, DSM) and 20 wt. % of melam prepared as described in Example 3, was extruded in a twin-screw extruder at a temperature of 320° C., and the extrudate was granulated. Test bars were made from the granular polymer composition in accordance with UL 94. The test bars were subjected to the UL 94 flame retardancy test. The resulting UL 94 rating was V-0 at 1.6 mm.

EXAMPLE 5

In an experiment analogous to that of Example 4, a powder mixture of 90 wt. % of nylon 4/6 (36.1 kg, Stanyl™, DSM) and 10 wt. % of melam (prepared as described in Example 3) was processed to yield a granulate. The test bars made from this granulate satisfied the UL 94 V-0 requirements at 1.6 mm.

EXAMPLE 6

In an experiment analogous to that of Example 4, a powder mixture of 80 wt. % of nylon 6/6 (Akulon™, DSM) and 20 wt. % of melam prepared as in Example 3 was processed to a granulate. The test bars satisfied the UL 94 V-0 requirement at 1.6 mm.

EXAMPLE 7

A mixture in powder comprising of 80 wt. % of ABS (Ronfalin™ from DSM) and 20 wt. % of melam prepared as described in Example 3, was extruded with a twin-screw extruder at a temperature of 275° C. and processed to yield a granulate. Test bars were made from the granulate and tested in accordance with UL 94. All test bars satisfied the UL 94 V-0 requirements at 1.6 mm.

EXAMPLE 8

A mixture comprising of 80 wt. % of polyurethane and 20 wt. % of melam prepared as described in Example 3, was extruded in a twin-screw extruder at a temperature of 290° C. and processed to yield a granulate. Test bars were made from the granulate by injection molding and tested for flame retardancy. All bars satisfied the UL 94 V-0 requirement at 1.6 mm thickness of the test bars.

EXAMPLE 9

A mixture comprising of 80 wt. % of nylon 4.6 (Stanyl® from DSM) and 20 wt. % of melam with 2 wt. %, with respect to the melam, of free paratoluene sulfonic acid, was extruded in a twin-screw extruder at a temperature of 320° C. Due to foaming problems the test bars produced did not satisfay the UL 94 requirements.

While the invention has been described in detail and with reference to specific embodiments thereof, it will be apparent to those of ordinary skill in the art that various changes and modifications can be made therein without departing from the spirit and scope thereof.

What we claim is:

1. A composition comprising (i) a moldable polymer, and (ii) a melamine condensation product, wherein the amount of (i) and the amount of (ii) are effective in providing said composition with flame retardancy and moldability.

2. A composition according to claim 1, wherein said melamine condensation product is produced by a process comprising:

heating a starting material comprising melamine or a melamine salt in the presence of (i) at least one organic acid, (ii) at least one ammonia or melamine salt of said organic acid, or (iii) a mixture of (i) and (ii), under reaction conditions effective for the formation of said melamine condensation product.

3. A composition according to claim 1, wherein said melamine condensation product comprises melam.

4. A composition according to claim 1, wherein said melamine condensation product has a residual condensation agent content of less than 1 wt. %.

5. A composition according to claim 1, wherein said moldable polymer is an injection moldable polymer.

6. A composition according to claim 1, wherein the amount of (i) is between about 5 and about 35 wt. %.

7. An article comprising said composition according to claim 1.

8. The composition of claim 1, wherein the melamine condensation product is selected from the group consisting of melam, melem and melone.

9. The composition of claim 1, wherein the melamine condensation product is a melam salt.

10. The composition of claim 1, wherein the melamine condensation product has a residual condensation agent content below 0.5 wt. %.

11. The composition of claim 1, wherein the amount of (i) is between about 10 and 25 wt. %.

12. The composition of claim 1, wherein said moldable polymers are thermoplastic polymers or thermosetting polymers.

13. The composition of claim 1, wherein said moldable polymer is selected from the group consisting of polystyrene, poly(p-methylstyrene), poly(α-methylstyrene), styrene butadiene, styrene acrylonitrile, styrene alkylmethacrylate, styrene butadiene alkylacrylate, styrene-maleic anhydride, styrene-acrylonitrile-methylacrylate, styrene-butadiene-styrene, styrene-isoprene-styrene, styrene-ethylene/butylene-styrene and styrene-ethylene/propylene/styrene.

14. The composition of claim 1, wherein said moldable polymer is a polyamide or a copolyamide derived from diamines and dicarboxylic acids and/or from amino carboxylic acids or the corresponding lactams, said polyamides selected from the group consisting of polyamide 4, polyamide 6/6, polyamide 6/10, polyamide 6/9, polyamide 6/12, polyamide 4/6, polyamide 11, polyamide 12.

15. The composition of claim 1, wherein said moldable polymer is 1) polyphenylene oxide and sulfide, 2) mixtures of polyphenylene oxide and sulfide with styrene polymers or 3) mixtures of polyphenylene oxide and sulfide with polyamides.

16. The composition of claim 1, wherein said moldable polymer is a graft copolymer selected from the group consisting of 1) styrene on polybutadiene, 2) α-methylstyrene on polybutadiene, 3) polybutadiene-styrene copolymers, 4) polybutadiene-acrylonitrile copolymers, 5) styrene and acrylonitrile on polybutadiene, 6) styrene and methacrylonitrile on polybutadiene, 7) styrene, acrylonitrile and methylmethacrylate on polybutadiene, 8) styrene and maleic anhydride on polybutadiene, 9) styrene, acrylonitrile and maleic anhydride on polybutadiene, 10) styrene, acrylonitrile and maleic acid imide on polybutadiene, 11) styrene and maleic acid imide on polybutadiene, 12) styrene and alkyl acrylate on polybutadiene, 13) styrene and alkyl methacrylate on polybutadiene, 14) styrene and acrylonitrile on ethylene-propylene-diene terpolymers, 13) polyalkyacrylate on acrylate-butadiene copolymer, 14) polyalkylmethacrylate on acrylate-butadiene copolymer and 15) mixtures thereof with the polymers in claim 14.

17. The composition of claim 1, wherein said moldable polymer is 1) aromatic polyamides based on an aromatic diamine and adipic acid, or 2) polyamides made from hexamethylene diamine and isophthalic and/or terphthalic acid.

18. The composition of claim 1, wherein said moldable polymer is a block copolymers of polyamides with polyolefins, olefin copolymers, ionomers or chemically bound or grafted elastomers, or with polyethers.

19. The composition of claim 1, wherein said moldable polymer is a polyamide or copolyamide modified with EPT or ABS.

20. The composition of claim 1, wherein said moldable polymer is a member selected from the group consisting of 1) polyesters derived from dicarboxylic acids, dialcohols and hydroxycarboxylic acids or the corresponding lactones, 2) polyesters derived from hydroxycarboxylic acids or the corresponding lactones, 3) block polyether esters derived from polyethers with hydroxyl end groups and 4) polyesters modified with polycarbonates or MBS.

21. The composition of claim 20, wherein said polyesters are polyethylene terephthalate, pol ybu tylene terephthalate, or poly-1,4-dimethylolcyclohexane terephthalate, polyhydroxybenzoates.

22. The composition of claim 1, wherein said moldable polymer is a member selected from the group consisting of polycarbonate, polyester carbonates, polysulfone, polyether sulfone and polyether ketone.

23. The composition of claim 1, wherein said moldable polymer is a thermosetting resin selected from the group consisting of 1) unsaturated polyesters, 2) saturated polyesters, 3) alkyd resins, 4) polyacrylates, 5) polyethers and 6) compositions of one or more of these polymers and a crosslinking agent.

* * * * *